US012497327B2

(12) United States Patent
Langsdorf et al.

(10) Patent No.: US 12,497,327 B2
(45) Date of Patent: Dec. 16, 2025

(54) TOUGHENABLE GLASS ARTICLE WITH NEGATIVE RELATIVE THERMAL LENGTH CHANGE POTENTIAL (71) Applicant: Schott AG, Mainz (DE)

(72) Inventors: Andreas Langsdorf, Ingelheim (DE); Markus Heiss, Bischofsheim (DE); Vanessa Gläßer, Mainz (DE)

(73) Assignee: Schott AG, Mainz (DE)

( * ) Notice: Subject to any disclaimer, the term of this patent is extended or adjusted under 35 U.S.C. 154(b) by 839 days.

(21) Appl. No.: 17/715,663

(22) Filed: Apr. 7, 2022

(65) Prior Publication Data
US 2022/0332636 A1 Oct. 20, 2022

(30) Foreign Application Priority Data

Apr. 7, 2021 (DE) ..................... 10 2021 108 658.2

(51) Int. Cl.
B32B 15/04 (2006.01)
B32B 17/06 (2006.01)
C03C 3/078 (2006.01)
C03C 3/083 (2006.01)
C03C 3/087 (2006.01)
C03C 21/00 (2006.01)

(52) U.S. Cl.
CPC ............ *C03C 21/002* (2013.01); *C03C 3/078* (2013.01); *C03C 3/083* (2013.01); *C03C 3/087* (2013.01)

(58) Field of Classification Search
CPC .................................................. C03C 21/002
USPC ................................. 428/410, 426
See application file for complete search history.

(56) References Cited

U.S. PATENT DOCUMENTS

| 2011/0048074 | A1* | 3/2011 | Danielson | C03C 3/091 |
| | | | | 65/90 |
| 2011/0302962 | A1* | 12/2011 | Gattermann | C03C 3/087 |
| | | | | 65/29.21 |
| 2012/0088648 | A1* | 4/2012 | Ellison | C03C 3/093 |
| | | | | 501/59 |
| 2014/0137602 | A1* | 5/2014 | Tamamura | C03B 17/06 |
| | | | | 65/94 |
| 2014/0220309 | A1* | 8/2014 | Vogt | C03C 17/23 |
| | | | | 65/60.5 |
| 2014/0357467 | A1* | 12/2014 | Buellesfeld | C03B 29/04 |
| | | | | 65/273 |
| 2018/0222790 | A1* | 8/2018 | Fotheringham | C03C 10/0054 |
| 2019/0062200 | A1* | 2/2019 | He | C03C 3/078 |
| 2020/0095155 | A1 | 3/2020 | Burdette et al. | |

(Continued)

FOREIGN PATENT DOCUMENTS

CN 108249743 A 7/2018

OTHER PUBLICATIONS

German Office Action dated Dec. 10, 2021 for German Patent Application No. 10 2021 108 658.2 (6 pages).

(Continued)

*Primary Examiner* — Lauren R Colgan
(74) *Attorney, Agent, or Firm* — TAYLOR & EDELSTEIN, PC (57) ABSTRACT A toughenable glass article includes a glass and has a thickness of less than 100 μm and a cooling state which is such that, after chemical toughening to a depth of 30% of the thickness, the glass article has a relative thermal length change potential in a range from −1500 ppm to ≤0 ppm.

20 Claims, 2 Drawing Sheets (56) References Cited

U.S. PATENT DOCUMENTS

2020/0102245 A1\* 4/2020 Da .......................... C03C 3/097
2021/0269347 A1 9/2021 Zimmer et al.

OTHER PUBLICATIONS

English translation of German Office Action dated Dec. 10, 2021 for German Patent Application No. 10 2021 108 658.2 (12 pages).
Adam Ellison et al., "Glass Substrates for Liquid Crystal Displays", International Journal of Applied Glass Science, 1 [1], pp. 87-103, Mar. 1, 2010 (17 pages).
European Office Action dated Sep. 14, 2022 for European Patent Application No. 22166762.9 (7 pages).
"Glasswork Zhi Er Ran Du/Xi Er] Bi Shu", Wang Cun You Jiang Wan Zhu Qu, Cai Bi Jing = Zhong Tian Jue Gong Cun Miao Publishing 932.1, TSB N 7-5019-01751-1, Mar. 31, 2000 (2 pages).
Machine translation of "Glasswork Zhi Er Ran Du/Xi Er] Bi Shu", Wang Cun You Jiang Wan Zhu Qu, Cai Bi Jing = Zhong Tian Jue Gong Cun Miao Publishing 932.1, TSB N 7-5019-01751-1, Mar. 31, 2000 (3 pages).
"Sacrificial Molybdenum Fortress", Laifii Hawk, Seizing Struggle Field Barrier Deer Fat Ointment Emotion Matching, Skeleton Twisting Nitrile Trench Year Clam Twisting Placement Yu, Patetern VAlle Peak s Shape Curve Tungsten, (3 pages).
Machine translation of "Sacrificial Molybdenum Fortress", Laifii Hawk, Seizing Struggle Field Barrier Deer Fat Ointment Emotion Matching, Skeleton Twisting Nitrile Trench Year Clam Twisting Placement Yu, Patetern VAlle Peak s Shape Curve Tungsten, (3 pages).

\* cited by examiner

TOUGHENABLE GLASS ARTICLE WITH NEGATIVE RELATIVE THERMAL LENGTH CHANGE POTENTIAL

CROSS REFERENCE TO RELATED APPLICATIONS

This application claims priority to German Patent Application No. DE 10 2021 108 658.2 filed on Apr. 7, 2021, which is incorporated in its entirety herein by reference.

BACKGROUND OF THE INVENTION

1. Field of the Invention

The present invention relates to a toughenable glass article with negative relative thermal length change potential as well as a method for producing the glass article.

2. Description of the Related Art

In the event of a change in temperature, a change in the length of a glass article occurs. An increase in temperature is associated with an expansion and a reduction in temperature is associated with a contraction of the glass article. The extent of the temperature-dependent change in length is generally described with the aid of the coefficient of thermal expansion (CTE). Corresponding temperature-dependent changes in length are normally substantially reversible. If the article is heated, for example, from a temperature T0 to a temperature T1, wherein the length of the article in the case of T1 is greater than in the case of T0, and the article is subsequently cooled again to temperature T0, the length of the article at temperature T0 prior to heating to T1 corresponds substantially to the length of the article at temperature T0 after cooling from T1 to T0.

Moreover, thermal treatment of a glass article can, however, also be associated with a change in length after cooling to starting temperature T0. If, for example, the article is heated from a temperature T0 to a temperature T1 and subsequently cooled again to temperature T0, the length of the article at temperature T0 prior to heating to T1 can deviate from the length of the article at temperature T0 after cooling from T1 to T0. This is often due to a change in the fictive temperature of the glass as a result of the thermal treatment.

Since glasses are not cooled to an endlessly slow degree during production, there is generally no time to assume a balanced state which corresponds to their respective temperature. The structure of a glass at room temperature therefore usually corresponds to the balanced structure for a higher temperature. This is referred to as the fictive temperature. The fictive temperature is therefore a measure of the cooling state of the glass. The higher the fictive temperature, the looser the network.

If a glass article undergoes thermal treatment, in particular at temperatures slightly below transformation temperature Tg (for example, approximately 60 K below Tg), the fictive temperature can be reduced. The network becomes tighter so that the article has a smaller length upon renewed cooling to the starting temperature (for example, room temperature) than prior to thermal treatment. The term "thermal shrinkage" is also used in this context.

Such long-lasting changes in length as a result of a thermal treatment are not necessarily a shrinkage of the article. It can in particular arise that heating from T0 to T1 and subsequent cooling from T1 to T0 is associated with an increase in the length of the article.

In order to be able to cover the concepts of both a shrinkage and an expansion of a glass article after thermal treatment, the corresponding property of a glass article is described in the present case as "relative thermal length change potential".

Glass materials of all types normally have a certain degree of "relative thermal length change potential". This means that, for example, in the case of a tempering in a suitable temperature range (in particularly slightly below transformation temperature Tg, for example, approximately 60 K below Tg) or also in the case of certain thermal loads from machining processes, the length of a glass article before and after the thermal treatment can differ. An expansion of the article is described as a change in length with a positive sign, while a shrinkage of the article is described as a change in length with a negative sign.

Theoretically, the relative thermal length change potential describes the maximum possible relative thermal length change for a given holding temperature independently of kinetic considerations. In general, however, the relative thermal length change is a time-dependent variable. The longer the tempering or thermal loading lasts at a given temperature, the greater the relative thermal length change. In the case of temperatures below Tg, the fictive temperature nevertheless asymptotically approaches the ambient temperature. The relative thermal length change per unit of time becomes smaller with increasing time of tempering or thermal loading, but mathematically never reaches a standstill. In order to be able to practically determine the relative thermal length expansion potential, an expedient period of time of thermal treatment must therefore be specified since it is not possible to temper the article for an indeterminately long time. A period of time of 24 hours has been shown to be a suitable period of time for determining the relative thermal length change potential. Once 24 hours have passed, no relevant change in the fictive temperature occurs any more.

The relative thermal length change potential is therefore determined according to the invention by a thermal treatment which includes keeping the glass article at a given temperature slightly below Tg (in particular approximately 60 K below Tg) for 24 hours. The relative thermal length change potential can be determined by comparing the lengths before and after the thermal treatment.

The temperature-time profile of thermal treatment and precise determination of lengths before and after thermal treatment are described in detail further herein.

In glass production processes, the glass, apart from possible special optical glasses, is generally not cooled extremely slowly in order to avoid costly cooling processes. This results in a cooling state of the glass which is associated with a shrinkage of the glass, i.e. with a negative relative thermal length change potential, in the case of tempering or thermal loading. One also talks in this context about glasses with a comparatively high fictive temperature. This effect also occurs in the case of glasses which are obtained from drawing processes.

If a relative thermal length change for an application with specific temperature loading should be reduced or ruled out, the glasses can undergo tempering. As a result of the tempering, the fictive temperature of the glass is reduced. It is possible to reduce the fictive temperature to such an extent that, in the event of renewed tempering or thermal loading, no noticeable further shrinkage of the glass occurs any more, hence the relative thermal length change potential is almost zero. Reducing the fictive temperature by tempering can be performed in a step which follows on from the production of the glass. It is also possible to provide the tempering as part of the production method. To this end, what are known as cooling furnaces can be provided by which the cooling speed of the glass immediately after forming can be reduced. The practicable length of such a cooling furnace is, however, not sufficient to reduce the relative thermal length change potential to a value close to zero. The drawing speed can additionally be reduced in the case of production using a drawing method such as, for example, a downdraw method. As a result of this, slower cooling occurs and as a result glasses with a reduced fictive temperature are obtained such that the extent of the shrinkage in the case of thermal loading of the glass below the current fictive temperature is reduced.

SUMMARY OF THE INVENTION

In some exemplary embodiments provided according to the present invention, a toughenable glass article includes a glass and has a thickness of less than 100 µm and a cooling state which is such that, after chemical toughening to a depth of 30% of the thickness, the glass article has a relative thermal length change potential in a range from −1500 ppm to ≤0 ppm.

In some exemplary embodiments provided according to the present invention, a toughenable glass article includes a glass and has a rate of change of a relative thermal length change potential as a function of characteristic penetration depth ($x_c$) in a range from 30 ppm per $x_c$ to 1000 ppm per µm $x_c$.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Exemplary embodiments provided according to the present invention provide a glass article with an improved cooling state. The article should have in particular a cooling state which is such that, after chemical toughening to a depth $x_c$ of 30% of the article thickness, a relative thermal length change potential is produced which is smaller than or equal to 0 ppm. The relative thermal length change potential which arises should nevertheless also not be so negative that a particularly large degree of tempering has to be performed after the toughening in order to obtain a glass article with a relative thermal length change potential of zero. The term chemical toughening to 30% of the article thickness refers in particular to chemical toughening on both sides to a depth $x_c$ of in each case 30% of the article thickness.

The glass article provided according to the present invention is a toughenable glass article, in particular a chemically toughenable glass article. An exchange of sodium for potassium normally takes place during chemical toughening, in particular by virtue of a glass which contains sodium being exposed at an elevated temperature to a melted potassium salt, for example, $KNO_3$. The toughenable glass article provided according to the present invention therefore may comprise sodium ions in order to enable a corresponding ion exchange. Alternatively or additionally, the glass article can also comprise lithium ions since the chemical toughening can likewise comprise the exchange of lithium for sodium and/or potassium.

In the exchange layer, the composition of the article is changed in comparison with the bulk. In particular, in the exchange layer, the proportion of at least one, for example precisely one, ion species is increased in comparison with the bulk and the proportion of at least one, for example precisely one, ion species is reduced in comparison with the bulk. The exchange layer may have a lower proportion of $Na^+$ ions and a higher proportion of $K^+$ ions than the bulk layer. The term exchange layer(s) therefore may designate the regions of the article in which the composition of the article was changed by the chemical toughening in comparison with the initial glass. The bulk layer may in contrast be the region of the article, the composition of which was not changed by the chemical toughening. This naturally only applies to those embodiments in which there is a region, the composition of which was not changed by the chemical toughening. Seen more generally, the bulk layer is the region of the article (in particular of the glass), in which the proportion of $Ion_R$ is the highest and correspondingly the proportion of Toni is the lowest. By implication, the term exchange layer(s) refers to the regions in which, in comparison with the bulk, the proportion of $Ion_R$ is reduced and the proportion of Toni is increased. According to the invention, the ion type with an increased proportion in the exchange layer in comparison with the bulk is referred to as Toni (for $Ion_{increased}$) and the ion type with a reduced proportion in the exchange layer in comparison with the bulk is referred to as $Ion_R$ (for $Ion_{Reduced}$). Toni may be $K^+$ and $Ion_R$ may be $Na^+$.

As a result of the process of chemical hardening, the proportions of the ions involved in the exchange process within the exchange layer are not distributed evenly over the entire thickness of the layer. Rather, a gradient from the article surface towards the bulk layer is produced in each case. In the case of the ions with increased proportions in the exchange layer in comparison with the bulk layer, the highest proportion of the article composition arises on the article surface. This then reduces towards the inside. The reverse occurs in the case of the ions with reduced proportions in the exchange layer in comparison with the bulk layer. Its proportion on the article surface is the lowest and then increases towards the inside.

One should therefore not imagine the exchange layer and bulk layer as layers which are separate from one another. Rather, the corresponding terms are only intended to express that there are regions in the article in which the proportions of individual ion species were significantly increased or reduced (the at least one exchange layer) as a result of the exchange process, while the proportions of the corresponding ions in other regions of the article were not changed or were only changed to a small degree by the exchange process (the bulk layer). As described further herein, the proportion of the ions involved in the exchange process in the exchange layer asymptotically approaches the corresponding proportion in the bulk layer so that it is difficult to indicate the exact position of the transition of the exchange layer into the bulk layer. It is therefore commonplace not to indicate the exact depth of the exchange layer, but rather characterize the extent of the exchange in a different manner. According to the invention, characteristic penetration depth $x_c$ described in detail below is used in this context. In the case of a depth of $x=2*x_c$, the article composition corresponds, apart from negligible deviations, again to the composition in the bulk. Negligible deviations may be deviations in the content of individual components of in each case ±1%, for example ±0.5% in comparison with the content in the bulk.

The change in the proportions of the ions involved in the ion exchange process is generally not linear, as already indicated previously. On the contrary, the profile of the proportions can, at least in the case of a simple exchange process, be described by a (complementary) error function. The error function is often referred to as a "Gaussian error function". The error function is generally abbreviated as "erf" and the complementary error function as "erfc".

Figure 4:
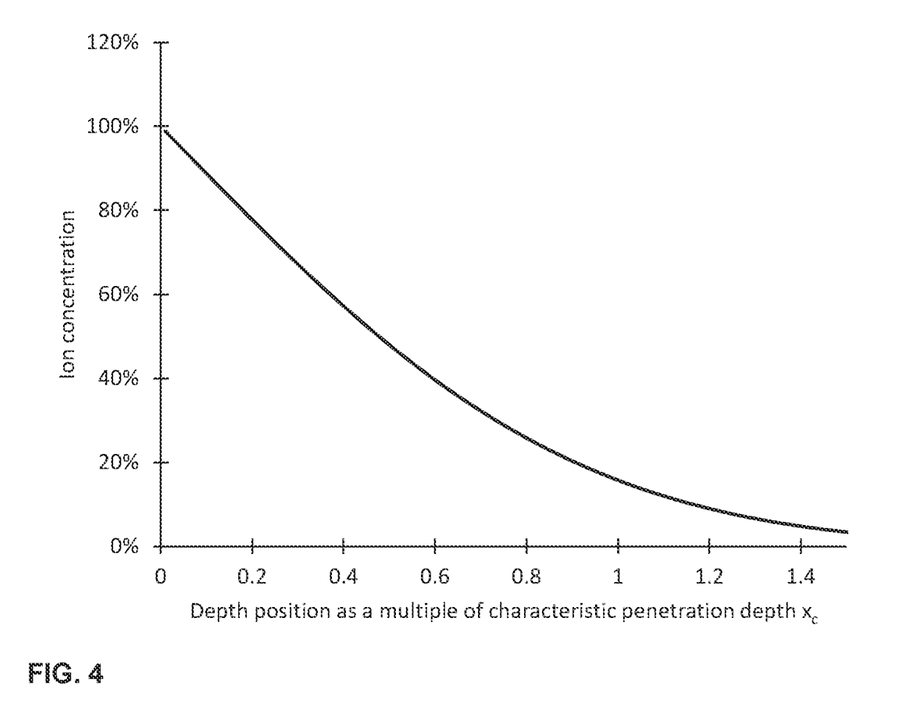
FIG. 4 shows, by way of example, the profile, brought about by an exchange process, of the concentration of an ion $Ion_I$, the proportion of which is increased in the exchange layer in comparison with the bulk glass layer (for example, $K^+$).

FIG. 4 illustrates by way of example the ion content profile brought about by the exchange process, the proportion of which is increased in the exchange layer in comparison with the bulk glass layer (for example, 10. The content is 100% on the glass surface (x=0) and decreases towards the inside of the glass on the basis of a complementary error function (erfc). The representation is selected so that 100% corresponds to the maximum difference of the proportion of the relevant ion to the proportion in the bulk, while 0% expresses that there is no difference to the bulk. The expression 0% therefore does not mean that the proportion of the ion in the corresponding depth is 0%. On the contrary, it is expressed that there is no difference to the proportion in the bulk. In the case of 0%, one is no longer in the exchange layer, but rather in the bulk.

The curve profile can be described for the ions with increased proportions in the exchange layer in comparison with the bulk layer by the following equation:

$$c(x, t) = \text{erfc}\left(\frac{x}{2 \cdot \sqrt{D \cdot t}}\right),$$

wherein x designates the relative article depth position, D designates the diffusion coefficient and t designates the toughening time.

The curve profile can be described by the following equation for the ions with reduced proportions in the exchange layer in comparison with the bulk layer:

$$c(x, t) = \text{erf}\left(\frac{x}{2 \cdot \sqrt{D \cdot t}}\right) = 1 - \text{erfc}\left(\frac{x}{2 \cdot \sqrt{D \cdot t}}\right),$$

wherein x designates the relative article depth position, D designates the diffusion coefficient and t designates the toughening time.

Diffusion coefficient D is different for different combinations of the ion species involved in the exchange and for different temperatures and for different materials. Diffusion coefficient D is measured in the unit $m^2/s$. Characteristic penetration depth $x_c$ can be calculated by the following equation from diffusion coefficient D and toughening time t:

$$x_c = 2 \cdot \sqrt{D \cdot t}$$

Toughening time t is the time during which the article is in the toughening bath. This time can be determined in an automated manner or by manual time measurement. Diffusion coefficient D can, according to the invention, be determined with a plurality of different methods. The diffusion coefficient may be calculated via a depth profile of the exchanged ions by defined toughening temperature and time. This depth profile can be measured, for example, with EDX (Energy-Dispersive X-ray Spectroscopy). Alternatively, the ToF-SIMS method (Time-of-Flight Secondary Ion Mass Spectrometry) can be used. In the case of the ToF-SIMS method, material is knocked out of the article surface with the ion beam and then the composition of the thus generated ions is measured. By knocking out the material, one "bores" into the depth of the article and can detect changes in the ion profile. Further suitable methods are known to the person skilled in the art.

The following therefore applies for $x=x_c$:

$$c(x_c) = \text{erfc}(1) \approx 15.7\%$$

In the case of a depth of $x=x_c$, the proportion of ions which goes beyond the base proportion with increased proportions in the exchange layer in comparison with the bulk layer is approximately 15.7% of the maximum excess proportion located on the glass surface. $x_c$ can thus not only be calculated from diffusion coefficient D and toughening time t according to the previously mentioned formula, but can also be determined on the basis of the depth profile determined, for example, by EDX or ToF-SIMS, as that depth x, in the case of which the proportion of ions which goes beyond the base proportion with increased proportions in the exchange layer in comparison with the bulk layer is approximately 15.7% of the maximum excess proportion located on the glass surface. Fitting of the complementary error function to the measurement data can be performed, for example, with the method of least squares. As described previously, fitting is performed such that 100% corresponds to the maximum difference of the proportion of the relevant ion to the proportion in the bulk, while 0% expresses that there is no difference to the bulk (see also FIG. 4).

Diffusion coefficient D described previously (also referred to as diffusivity D or as threshold diffusivity D) is a measure of toughenability. The indication of diffusivity does not mean that a glass has actually been chemically toughened. The diffusivity is rather a measure of the toughenability of a glass.

In the case of chemical toughening in $KNO_3$ at 380° C. for 46 minutes, diffusivity D may lie in a range from 10 µm² per hour to 80 µm² per hour, for example, from 15 µm² per hour to 80 µm² per hour, or from 20 µm² per hour to 80 µm² per hour, in particular from 25 µm² per hour to 70 µm² per hour or from 30 µm² per hour to 60 µm² per hour. Diffusivity D can, in the case of chemical toughening in $KNO_3$ at 380° C. for 46 minutes, be, for example, at least 10 µm² per hour, at least 15 µm² per hour, at least 20 µm² per hour, at least 25 µm² per hour or at least 30 µm² per hour. Diffusivity D can, in the case of chemical toughening in $KNO_3$ at 380° C. for 46 minutes, be, for example, at most 80 µm² per hour, at most 70 µm² per hour or at most 60 µm² per hour. If reference is made in this disclosure to numerical values of diffusivity D, diffusivity D for chemical toughening in $KNO_3$ at 380° C. for 46 minutes is meant, unless indicated otherwise.

As described previously, articles with a reduced fictive temperature can prove to be advantageous in order to reduce the extent of shrinkage in the event of thermal loading of the article below the fictive temperature. It has been shown that certain post-processing steps of a glass can likewise lead to a displacement of the relative thermal length change potential towards less negative values. One particularly relevant post-processing step is chemical toughening of a glass. During chemical toughening (also referred to as chemical hardening) smaller ions are replaced by larger ions in an ion exchange process. An exchange of sodium for potassium normally takes place, in particular by virtue of a glass which contains sodium being exposed at an elevated temperature to a melted potassium salt, for example, $KNO_3$. The influence of chemical hardening on the relative thermal length change potential differs from the influence of the tempering described previously in that, as a result of the chemical hardening, not only a displacement of the relative thermal length change potential towards less negative values is possible, but, after the chemical toughening, a relative thermal length change potential with a positive sign can arise. If such glasses are exposed to thermal loading once again after toughening, a shrinkage therefore does not arise, but rather an expansion of the glass. This can prove to be particularly disadvantageous in that there is no possibility of a renewed reduction in the relative thermal length change potential. A relative thermal length change potential of zero or almost zero can therefore no longer be achieved with such glasses. Glasses with a negative relative thermal length change potential after chemical toughening can, however, be transferred by a tempering into a cooling state which corresponds to a relative thermal length change potential of almost zero. This is not possible in the case of glasses with positive relative thermal length change potential since a tempering cannot displace the relative thermal length change potential towards more negative values.

As a result of the chemical toughening, the relative thermal length change potential is displaced towards less negative or even towards positive values. The larger the characteristic penetration depth $x_c$ is in comparison with the thickness of the glass article, the greater the extent of this change in the relative thermal length change potential as a result of the chemical toughening. The effect therefore has particularly high relevance in the case of thin glasses and very thin glasses since, in the case of these glasses, characteristic penetration depth $x_c$ is often particularly large in comparison with the article thickness. It is not uncommon that characteristic penetration depth $x_c$ makes up 30% of the thickness of the glass article. Chemical toughening to 30% of the article thickness refers in particular to chemical toughening on both sides to a characteristic penetration depth $x_c$ of in each case 30% of the article thickness. In the case of superficial substrates, toughening is generally where possible performed symmetrically since the formation of a solid warp would otherwise arise.

In order to avoid the relative thermal length change potential being displaced by the chemical toughening to such an extent towards less negative values that, after toughening, a relative thermal length change potential with a positive sign is produced, glass articles would have to be provided which have, prior to toughening, a sufficiently negative relative thermal length change potential so that the displacement towards less negative values as a result of the toughening is not sufficient to obtain, after toughening, a relative thermal length change potential with a positive sign. On the other hand, the relative thermal length change potential should also not be so negative prior to toughening that a very pronounced negative relative thermal length change potential is still present after toughening. This is because this would have the result that the glass article would have to undergo a particularly extensive tempering in order to obtain a glass article with a relative thermal length change potential of zero or almost zero, which may be desired depending on the application.

As described, the present invention relates to a toughenable glass article. The invention furthermore also relates to a toughened glass article, in particular a chemically toughened glass article.

Glass articles with particularly small thicknesses, in particular with thicknesses of less than 100 µm, are generally produced using a drawing method, in particular with a downdraw method. The cooling state of the glass article is largely determined by the cooling rate and thus by the drawing rate (also referred to as drawing speed). In order to obtain a glass article with a cooling state which makes it possible that, even after chemical toughening to a depth $x_c$ of 30% of the article thickness, the relative thermal length change potential is smaller than or equal to zero, high drawing rates must be used. As a result of this, glass articles with such negative relative thermal length change potential are obtained that this is not overcompensated by the chemical toughening to a depth $x_c$ of 30% of the article thickness towards values with a positive sign. The drawing rates should nevertheless also not be too high since otherwise, even after chemical toughening, a very negative relative thermal length change potential is still present such that intensive tempering would be necessary to obtain a glass article with a relative thermal length change potential of zero or almost zero.

The drawings rate which achieve the desired success depend on the glass composition. It is therefore not easily possible to transmit the drawing rate which is optimized in relation to a specific glass composition one to one to a different glass composition. In order to find a suitable drawing rate in the individual case, various drawing rates can be tested and their influence on the relative thermal length change potential can be examined. A promising starting point is, for example, drawing rates in a range from 10 m/min to 40 m/min.

In some embodiments, the invention relates to a toughenable glass article with a thickness of less than 100 µm and a cooling state which is such that, after chemical toughening to a depth $x_c$ of 30% of the article thickness, the glass article has a relative thermal length change potential in a range from −1500 ppm to ≤0 ppm.

Chemical toughening to 30% of the article thickness is understood in particular as chemical toughening on both sides to a depth of in each case 30% of the article thickness.

The toughenable glass article provided according to the present invention has a certain cooling state. This is determined with a measuring method in the case of which the toughenable glass article is initially toughened chemically to a depth $x_c$ of 30% of the article thickness and subsequently the relative thermal length change potential of the toughened article is determined. The relative thermal length change potential of the toughened article is a measure for the cooling state of the toughenable glass article. How the relative thermal length change potential is determined is described in detail further herein. In order to determine the relative thermal length change potential of the toughened glass article, in particular lengths of the toughened glass article are determined before and after thermal treatment and measured against one another. In the course of thermal treatment, the toughened glass article is heated in particular to a temperature of approximately 60 K below Tg and kept for 24 hours at this temperature.

In some embodiments, the invention relates to a toughenable glass article with a rate of change of the relative thermal length change potential as a function of characteristic penetration depth $x_c$ in a range from 30 ppm per μm $x_c$ to 1000 ppm per μm $x_c$.

The glass article provided according to the present invention is a toughenable glass article. This glass article is in particular not toughened, for example, not chemically toughened and/or not thermally toughened. In some embodiments, the toughenable glass article can also be an already toughened glass article. In particular, it is possible to further toughen a glass article which has already been toughened to a certain degree.

After chemical toughening to a depth $x_c$ of 30% of the article thickness, the relative thermal length change potential may lie in a range from −1500 ppm to ≤0 ppm, for example, from −1200 ppm to <0 ppm, from −1000 ppm to −100 ppm, from −950 ppm to −200 ppm, from −900 ppm to −250 ppm, from −850 ppm to −300 ppm, or from −800 ppm to −400 ppm. After chemical toughening to a depth $x_c$ of 30% of the article thickness, the relative thermal length change potential can be, for example, at least −1500 ppm, in particular at least −1200 ppm, at least −1000 ppm, at least −950 ppm, at least −900 ppm, at least −850 ppm, or at least −800 ppm. After chemical toughening to a depth $x_c$ of 30% of the article thickness, the relative thermal length change potential can be, for example, at most 0 ppm, in particular less than 0 ppm, at most −100 ppm, at most −200 ppm, at most −250 ppm, at most −300 ppm, or at most −400 ppm.

The surface compressive stress ("CS") after chemical toughening to a depth $x_c$ of 30% of the article thickness can lie in a range from 600 MPa to 1000 MPa, for example, from 650 MPa to 900 MPa or from 700 MPa to 850 MPa. The surface compressive stress after chemical toughening to a depth $x_c$ of 30% of the article thickness can be, for example, at least 600 MPa, at least 650 MPa or at least 700 MPa. The surface compressive stress after chemical toughening to a depth $x_c$ of 30% of the article thickness can be, for example, at most 1000 MPa, at most 900 MPa or at most 850 MPa. The surface compressive stress can be measured with a surface stress measurement device, in particular with FSM 6000.

The problem that the relative thermal length change potential is displaced by the chemical toughening into the positive value range arises in particular in the case of those glasses which have a comparatively high dependence of the relative thermal length change potential on characteristic penetration depth $x_c$. Glass articles provided according to the present invention can have in particular a rate of change of the relative thermal length change potential as a function of characteristic penetration depth $x_c$ in a range from 30 ppm per μm $x_c$ to 1000 ppm per μm $x_c$, for example, in a range from 35 ppm per μm $x_c$ to 700 ppm per μm $x_c$, from 40 ppm per μm $x_c$ to 500 ppm per μm $x_c$, from 45 ppm per μm $x_c$ to 400 ppm per μm $x_c$, from 50 ppm per μm $x_c$ to 350 ppm per μm $x_c$, from 55 ppm per μm $x_c$ to 300 ppm per μm $x_c$, from 60 ppm per μm $x_c$ to 250 ppm per μm $x_c$, from 65 ppm per μm $x_c$ to 200 ppm per μm $x_c$, from 70 ppm per μm $x_c$ to 150 ppm per μm $x_c$, or from 75 ppm per μm $x_c$ to 100 ppm per μm $x_c$. The rate of change of the relative thermal length change potential as a function of characteristic penetration depth $x_c$ can be, for example, at least 30 ppm per μm $x_c$, at least 35 ppm per μm $x_c$, at least 40 ppm per μm $x_c$, at least 45 ppm per μm $x_c$, at least 50 ppm per μm $x_c$, at least 55 ppm per μm $x_c$, at least 60 ppm per μm $x_c$, at least 65 ppm per μm $x_c$, at least 70 ppm per μm $x_c$, at least 75 ppm per μm $x_c$. The rate of change of the relative thermal length change potential as a function of characteristic penetration depth $x_c$ can be, for example, at most 1000 ppm per μm $x_c$, at most 700 ppm per μm $x_c$, at most 500 ppm per μm $x_c$, at most 400 ppm per μm $x_c$, at most 350 ppm per μm $x_c$, at most 300 ppm per μm $x_c$, at most 250 ppm per μm $x_c$, at most 200 ppm per μm $x_c$, at most 150 ppm per μm $x_c$, at most 100 ppm per μm $x_c$.

Figure 1:
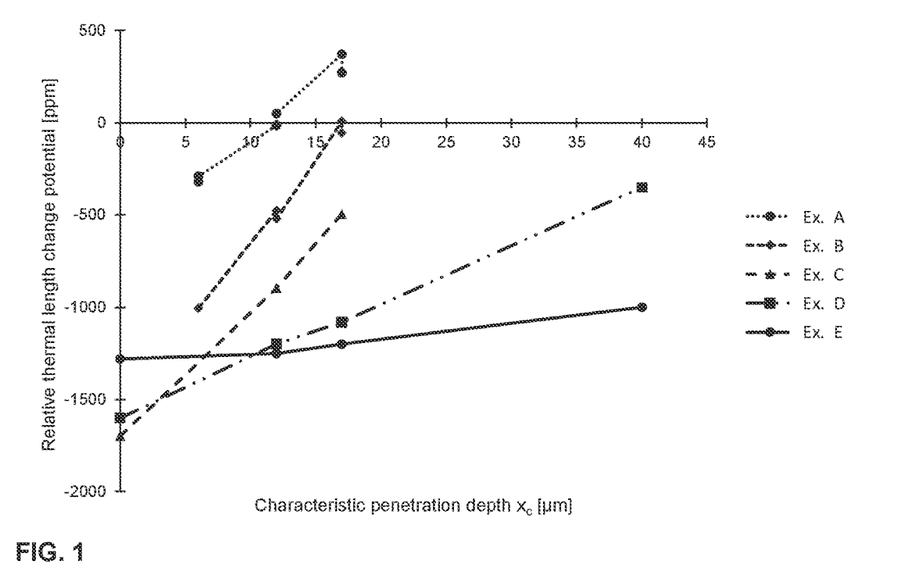
FIG. 1 illustrates the relative thermal length change potential (y-axis) of various glass articles as a function of the characteristic penetration depth $x_c$ (x-axis)

As shown in FIG. 1, the rate of change of the relative thermal length change potential as a function of characteristic penetration depth $x_c$ is largely dependent on the article thickness. The thinner the glass article, the greater the rate of change of the relative thermal length change potential. The rate of change of the relative thermal length change potential as a function of characteristic penetration depth $x_c$ can therefore also be indicated in relation to a specific reference thickness of an article in order to obtain a parameter which enables a greater conclusion as to behaviour irrespective of the geometric configuration of the article in terms of the article thickness. The fact that the rate of change relates to a specific reference thickness of an article does not mean that the corresponding article must necessarily also have this thickness. As shown in FIG. 1, the cooling state does indeed have a large influence on the relative thermal length change potential, but only a lesser influence on the rate of change of the relative thermal length change potential as a function of characteristic penetration depth $x_c$. It is therefore possible to indicate the rate of change of the relative thermal length change potential as a function of characteristic penetration depth $x_c$ without having to take into account the cooling state. In the case of a reference thickness of 50 μm, the rate of change of the relative thermal length change potential as a function of characteristic penetration depth $x_c$ can lie, for example, in a range from 50 to 100 ppm per um $x_c$.

Figure 2:
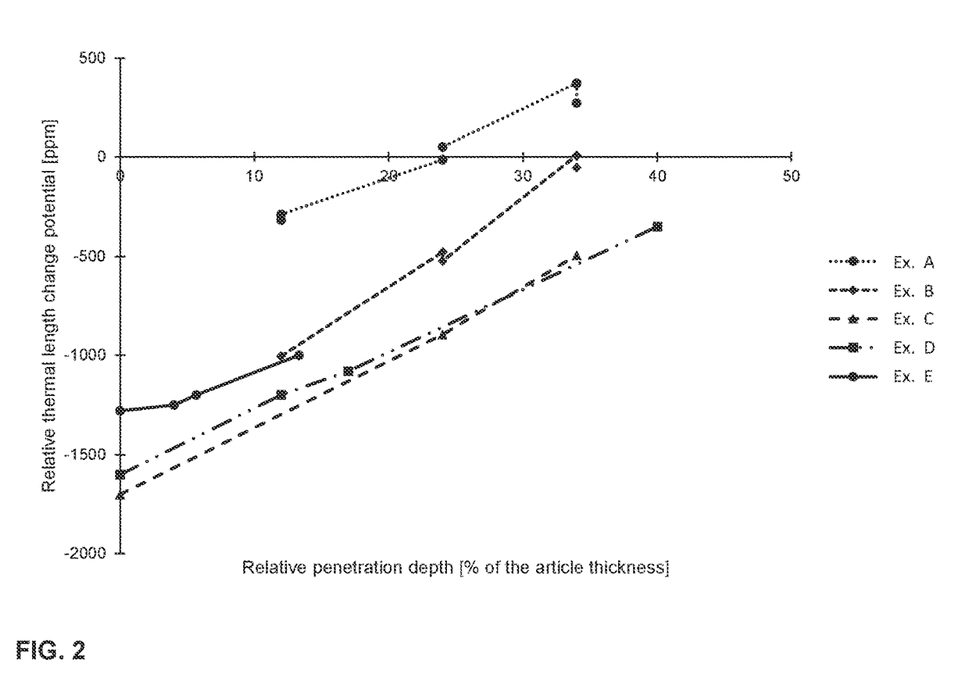
FIG. 2 shows the relative thermal length change potential (y-axis) of glass articles A to E as a function of the relative penetration depth (x-axis)

It is also possible to indicate the rate of change of the relative thermal length change potential as a function of the relative penetration depth (see data in FIG. 2). The relative penetration depth is produced from the quotient from $x_c$ and article thickness and is indicated as "% of the article thickness". A smaller difference of the gradients of the individual straight lines in the case of different article thicknesses arises in comparison with FIG. 1 in the case of the representation of FIG. 2. This is thus to be explained in that the relative penetration depth represents a standardization of characteristic penetration depth $x_c$ to the article thickness. Glass articles provided according to the present invention can in particular have a rate of change of the relative thermal length change potential as a function of the relative penetration depth in a range from 20 ppm per % of the article thickness to 100 ppm per % of the article thickness, for example, from 25 ppm per % of the article thickness to 50 ppm per % of the article thickness, or from 30 ppm per % of the article thickness to 45 ppm per % of the article thickness. The rate of change of the relative thermal length change potential as a function of the relative penetration depth can be, for example, at least 20 ppm per % of the article thickness, at least 25 ppm per % of the article thickness or at least 30 ppm per % of the article thickness. The rate of change of the relative thermal length change potential as a function of the relative penetration depth can be, for example, at most 100 ppm per % of the article thickness, at most 50 ppm per % of the article thickness or at most 45 ppm per % of the article thickness.

In order to determine the relative thermal length change potential after chemical toughening to a depth $x_c$ of 30% of the article thickness, it is not absolutely essential to toughen to a depth $x_c$ of precisely 30% of the article thickness. It is also possible to determine various measurement values at different toughening depths and determine the relative thermal length change potential after chemical toughening to a depth $x_c$ of 30% of the article thickness by interpolation or extrapolation of corresponding data, in particular by linear interpolation or linear extrapolation. For example, various reference articles can be toughened to different depths in a range from 0% to 40%, in particular from 10% to 35%, in order to determine the relative thermal length change potential in the case of toughening to a specific depth $x_c$ within the range. The relative thermal length change potential after chemical toughening to a depth $x_c$ of 30% of the article thickness can then be determined from corresponding data by interpolation or extrapolation, in particular by linear interpolation or linear extrapolation.

In order to determine the relative thermal length change potential, lengths of the glass article are determined before and after a thermal treatment and measured against one another. This can be performed as follows.

Length determination can be performed in particular optically. The exact dimensions of the sample before and after thermal treatment are optically measured, for example, with a coordinate measuring machine, in particular of the type ZEISS O-Inspect. In order to improve detection of the edges by the measurement system, the edges can be marked in advance, for example, by applying an optically detectable marking. In particular, the edges can be traced with a pen, for example, a black Edding pen. A black edge with a width of, for example, approx. 4 mm around the circumference can thus be generated. As a result of this, the detection of the edges can be significantly improved.

The sample size can be in particular 40 mm×140 mm.

Measurement of a single glass article is performed in particular in three steps:
a) Determining the focus levels: In order to be able to set the correct focus level during optical measurement, the height position of the sample is measured first. For this purpose, the integrated white light interferometry sensor can be moved along the edge of the sample and the z-position of the surface can be easily determined within the edge at several positions.
b) Determining the alignment of the sample: Before the exact measurement of the edge begins, the alignment of the sample can be checked with a small degree of enlargement. For this purpose, the optical measurement system can be moved over the (expected position) of one of the long edges. An image can be recorded at a distance of approx. 1 mm. As a result of the blackening of the edge of the sample, there is a high contrast in this image at the edge. In order to determine the position of the edge, the machine can generate a linear profile of the brightness values which runs perpendicular to the "expected" alignment of the edge. In this profile, the point at which the brightness value has dropped to 50% of the value in the bright range is regarded as the edge. A point of the edge is clearly defined by the position of the linear profile and the "50% pixel" thereon. The alignment of the edge in the coordinate system of the machine can be calculated by virtue of the fact that a straight line is fitted by the thus measured points along the long edge. This straight line then defines the alignment of the coordinate system of the sample.
c) Measuring the edges: Once the coordinate system of the sample is known, the machine can move the optical measurement system over the edges of the sample, wherein it follows the nominal dimensions. Points on the edge can now be determined with high resolution at a distance of approx. 35 µm (short edges) or 100 µm (long edges)—corresponding to the description under b). Straight lines can be fitted through the measurement points. The points of intersection of these straight lines define the corner of the sample. The edge lengths can be determined with the aid of the corners of the sample determined in this manner.

Both the initial geometry prior to thermal treatment and the final geometry after thermal treatment can be performed in accordance with the described method.

The temperature treatment can be performed in a furnace, in particular in a furnace of the type Nabertherm N20/HR. The furnace is controlled via a controller of the type EUROTHERM 2604. The samples may be placed at room temperature onto a flat Quarzal panel and these are then put into the furnace which is also at room temperature. A temperature profile can be specified via the controller which the furnace then follows.

Figure 3:
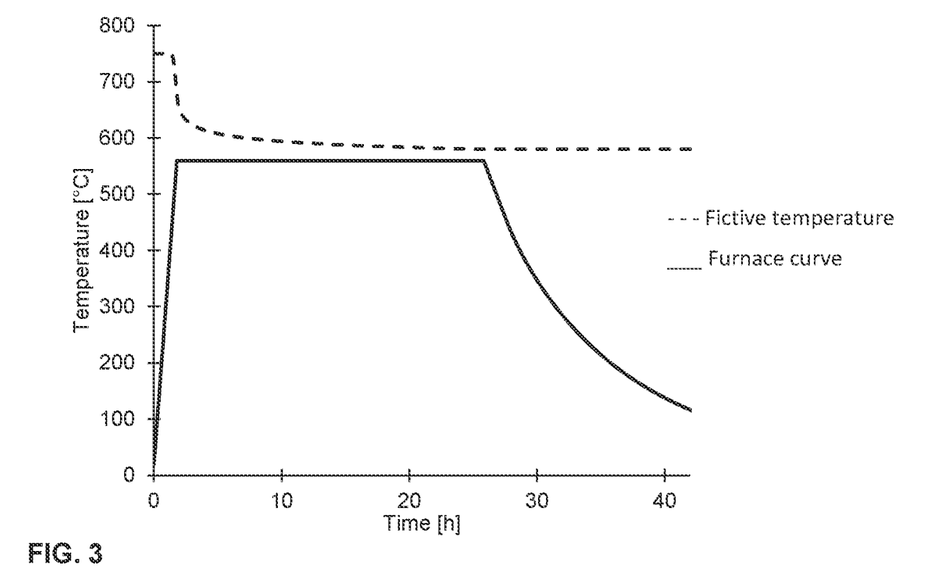
FIG. 3 shows the temperature profile of the furnace (continuous line) and the profile of the fictive temperature (dashed line) of a glass article tempered with the corresponding temperature profile.

One exemplary profile of the furnace temperature is shown by way of example in FIG. 3. The profile of the fictive temperature of an exemplary article provided according to the invention in the case of corresponding thermal treatment is also shown in FIG. 3.

The temperature profile is composed of three elements:
1) Heating up: The furnace can be heated up to the setpoint temperature, in particular with a rate of 5K/min. The setpoint temperature may be 60 K below Tg. In the case of a glass with a Tg of approximately 620° C., the setpoint temperature can be approximately 560° C. In the event of heating from room temperature to 560° C. with 5 K/min, it takes approximately 107 to 108 minutes until the setpoint temperature is reached (see also furnace curve in FIG. 3).
2) Holding time: The temperature in the furnace is kept constant in this period of time. The holding time is 24 hours. A period of time of 24 hours has been shown to be a particularly suitable period of time for determining the relative thermal length change potential. After the expiry of 24 hours, only a negligible change in the fictive temperature still takes place.
3) Cooling: In order to allow the samples to cool as quickly as possible, the furnace may not be heated further during cooling. It can thus follow its characteristic time profile during cooling. A corresponding characteristic time profile is shown by way of example in FIG. 3. Active cooling is generally not performed. It may, however, be ensured that a temperature of 100 K below the setpoint temperature is reached at the latest 125 minutes after the end of the holding time. A temperature of 200 K below the setpoint temperature may be reached at the latest 200 minutes after reaching the temperature of 100 K below the setpoint temperature. A temperature of 200° C. may, for example, be reached at the latest 30 hours after the end of the holding time. These values are achieved by conventional furnaces without active cooling. If particularly insulating furnaces are used, active cooling can be provided in order to achieve the described exemplary cooling characteristics. The furnace may be opened at the earliest once the temperature in the interior of the furnace has dropped below 100° C. In the case of conventional furnaces, a period of time of 15 to 20 hours should be expected until the furnace temperature has dropped below 100° C. During cooling, no noteworthy change in the fictive temperature occurs any more (FIG. 3), hence the precise time profile is not important.

The described measurements of the starting and final geometry supply (via the measured corners of the samples) the four edge lengths before and after tempering. A separate relative thermal length change potential$_i$ can be determined from this for each edge according to the following formula.

$$\text{Relative thermal length change potential}_i = \frac{L_{i,after} - L_{i,before}}{L_{i,before}}$$

Variable i is a control variable which in the case of quadrangular, in particular square or rectangular samples, goes from 1 to 4 and with which the individual edges are indicated. $L_{i,before}$ is the length of the i$^{th}$ edge prior to thermal treatment and $L_{i,after}$ is the length of the i$^{th}$ edge after thermal treatment.

The average can be calculated according to the following formula from these four individual values, relative thermal length change potential$_1$, relative thermal length change potential$_2$, relative thermal length change potential$_3$, and relative thermal length change potential$_4$.

$$\text{Relative thermal length change potential} = \frac{1}{4} \cdot \sum_{i=1}^{4} \text{Relative thermal length change potential}_i$$

This average is the relative thermal length change potential of the glass article.

The relative thermal length change potential can also be determined in a corresponding manner for other geometries. In the case of triangular samples, for example, variable i goes correspondingly from 1 to 3. In the case of round geometries, a suitable linear dimensional parameter can readily be selected for measurement, for example, the diameter or the circumference.

In some embodiments, several sheets can be measured simultaneously. This can be achieved, for example, with the aid of an "alignment board" on which several glass articles, for example, up to 27 sheets can be properly aligned, in particular by placing on stop pins. The geometric measurement of the samples can proceed automatically by a measurement program which knows the position of the individual sheets on the alignment board.

The glass article provided according to the invention has a thickness of less than 100 µm. The thickness of the glass article can be, for example, at least 15 µm, at least 17.5 µm, at least 20 µm, at least 22.5 µm, at least 25 µm or at least 30 µm. The thickness of the glass article can be, for example, at most 90 µm, at most 80 µm, at most 70 µm, at most 60 µm, at most 55 µm or at most 50 µm. The thickness of the glass article can lie, for example, in a range from 15 µm to 90 µm, from 17.5 µm to 80 µm, from 20 µm to 70 µm, from 22.5 µm to 60 µm, from 25 µm to 55 µm or from 30 µm to 50 µm.

The glass article can have at least one fire-polished surface, for example, precisely one fire-polished surface or precisely two fire-polished surfaces. Fire-polished surfaces can arise in particular from the production methods with which the glass articles can be obtained. Exemplary production methods are downdraw and overflow-fusion. In particular two fire-polished surfaces can be obtained with these.

Fire-polished surfaces are very smooth, i.e. they only have a very low degree of roughness. In contrast to mechanical polishing, a surface is not ground down during fire-polishing, rather the material to be polished is heated to such a high degree that it runs smooth. The costs for production of a smooth surface by fire-polishing are therefore significantly lower than for the production of a very smooth, mechanically polished surface.

The term "surfaces" in relation to the glass articles provided according to the invention refers to the upper and/or lower side, i.e. the two surfaces which are the largest in comparison with the other surfaces.

Fire-polished surfaces are characterised by a particularly low degree of roughness. The roughness of a fire-polished surface is lower than that of a mechanically polished surface.

The fire-polished surface(s) of the glass articles of this invention may have a quadratic roughness ($R_q$ or also RMS) of at most 5 nm, for example at most 3 nm or at most 1 nm. Roughness depth $R_t$ is, for the thin glasses, for example at most 6 nm, at most 4 nm, or at most 2 nm. The roughness depth is determined in accordance with DIN EN ISO 4287.

In the case of mechanically polished surfaces, the roughness values are inferior. Moreover, in the case of mechanically polished surfaces, traces of polishing can be seen under the atomic force microscope (AFM). Moreover, residues of the mechanical polishing agent, such as diamond powder, iron oxide and/or $CeO_2$, can likewise be detected under the AFM. Since mechanically polished surfaces must always be cleaned after polishing, leaching of specific ions occurs at the surface of the glass. This depletion of specific ions can be proven with secondary ion mass spectrometry (ToF-SIMS). Such ions are, for example, Ca, Zn, Ba and alkali metals.

In some embodiments, the toughenable glass article can comprise a glass or be composed of a glass which is selected from the group consisting of aluminosilicate glass, boroaluminosilicate glass, silicate glass and borosilicate glass.

In some embodiments, the glass has $SiO_2$ in a proportion of at least 40 wt.-% and/or of at most 75 wt.-%. $SiO_2$ contributes to the desired viscosity properties and to hydrolytic resistance. The proportion of $Al_2O_3$ can be at least 10 wt.-% and/or at most 30 wt.-%. A certain proportion of $Al_2O_3$ enables the desired chemical toughenability. In order to ensure adequate chemical toughenability, the aluminosilicate glass may contain at least 9 wt.-% $Na_2O$. The $Na_2O$ content can be restricted to up to 18 wt.-% or up to 16 wt.-%.

In some embodiments, the glass does not contain any $B_2O_3$ or only contains a small amount of $B_2O_3$. $B_2O_3$ has a positive influence on hydrolytic resistance, but it has a negative effect on chemical toughenability. Its content may therefore be restricted to at most 20 wt.-%, at most 10 wt.-%, at most 5 wt.-% or at most 2 wt.-%.

In some embodiments, the glass contains less than 1 wt.-% $Li_2O$, for example, less than 0.5 wt.-%, less than 0.2 wt.-%, or less than 0.1 wt.-%. The glass can contain, for example, less than 1 mol-% $Li_2O$, less than 0.5 mol-%, less than 0.2 mol-%, or less than 0.1 mol-%. The glass may even be free from $Li_2O$.

If it is stated in this description that the glasses are free from a component or do not contain a certain component, it is thus meant that this component may in any event be present as a contaminant in the glasses. This means that it is not added in significant quantities. According to the invention, insignificant quantities are quantities of less than 500 ppm, for example less than 300 ppm, less than 100 ppm, less than 50 ppm or less than 10 ppm, in each case on a weight basis or substance amount basis.

One exemplary aluminosilicate glass which contains alkali metal oxides has the following components:

|  | (Wt.-%) |
|---|---|
| $SiO_2$ | 40-75 |
| $Al_2O_3$ | 10-30 |
| $B_2O_3$ | 0-20 |
| $Na_2O + K_2O$ | >0-30 |
| $MgO + CaO + SrO + BaO + ZnO$ | 0-25 |
| $TiO_2 + ZrO_2$ | 0-15 |
| $P_2O_5$ | 0-10. |

The present invention also relates to a method for producing a toughenable glass article provided according to the present invention. The method comprises the following step:

a) providing a glass article using a drawing method.

The drawing method may be selected from the group consisting of downdraw, overflow-fusion and redrawing.

The drawing speed can be, for example, at least 10 m/min and/or at most 40 m/min. The cooling state of the glass article can be influenced by a targeted setting of the drawing speed. The cooling state in turn influences the relative thermal length change potential of the glass article. The setting of the cooling state nevertheless does not necessarily have to be performed solely via the setting of the drawing speed. If, for example, drawing was performed with a particularly high drawing speed so that the cooling state of the glass article is such that the relative thermal length change potential after chemical toughening to a depth $x_c$ of 30% of the article depth lies far in the negative range, the relative thermal length change potential can be displaced with a tempering towards less negative values. Such a tempering can be performed, for example, prior to or after chemical toughening. Too low a drawing speed should nevertheless be avoided since the relative thermal length change potential can be displaced by a tempering at all times only towards less negative or more positive values. If therefore the drawing speed was selected to be of such a slow speed that a relative thermal length change potential with a positive sign is produced after chemical toughening to a depth $x_c$ of 30% of the article thickness, there is no possibility for displacing the relative thermal length change potential into the negative value range.

It should furthermore be noted that the relative thermal length change potential is also influenced by the glass composition. A drawing speed optimised for a glass composition can therefore generally not be transmitted one to one to another glass composition. The person skilled in the art, however, easily achieves optimisation of the drawing speed via routine experiments in that various drawing speeds are tested and in each case the relative thermal length change potential is determined after chemical toughening to a depth $x_c$ of 30% of the article thickness.

Exemplary Embodiments

In some embodiments, the invention relates to a toughenable glass article with a thickness of 15 µm to 70 µm and a cooling state which is such that, after chemical toughening to a depth $x_c$ of 30% of the article thickness, the glass article has a relative thermal length change potential in a range from −1500 ppm to ≤0 ppm, wherein the glass article has at least one fire-polished surface.

In some embodiments, the invention relates to a toughenable glass article with a rate of change of the relative thermal length change potential as a function of characteristic penetration depth $x_c$ in a range from 30 ppm per µm $x_c$ to 1000 ppm per µm $x_c$ and a threshold diffusivity D of at least 10 µm² per hour, wherein the glass is selected from the group consisting of aluminosilicate glass, boroaluminosilicate glass, silicate glass and borosilicate glass and wherein the glass comprises $Na_2O$ in a proportion of at least 9 wt.-%.

In some embodiments, the invention relates to a toughenable glass article with a thickness of less than 100 µm and a cooling state such that, after chemical toughening to a depth $x_c$ of 30% of the article thickness, the glass article has a relative thermal length change potential in a range from −1500 ppm to ≤0 ppm, wherein threshold diffusivity D is at least 10 µm² per hour, wherein the glass is selected from the group consisting of aluminosilicate glass, boroaluminosilicate glass, silicate glass and borosilicate glass and wherein the glass comprises $Na_2O$ in a proportion of at least 9 wt.-%.

In some embodiments, the invention relates to a toughenable glass article with a rate of change of the relative thermal length change potential as a function of characteristic penetration depth $x_c$ in a range from 30 ppm per µm $x_c$ to 1000 ppm per µm $x_c$, wherein the glass article has at least one fire-polished surface.

In some embodiments, the invention relates to a toughenable glass article with a thickness of less than 100 µm and a cooling state which is such that, after chemical toughening to a depth $x_c$ of 30% of the article thickness, the glass article has a relative thermal length change potential in a range from −1500 ppm to ≤0 ppm, wherein the glass is an aluminosilicate glass and the rate of change of the relative thermal length change potential as a function of characteristic penetration depth $x_c$ lies in a range from 30 ppm per µm $x_c$ to 1000 ppm per µm $x_c$.

1. Relative Thermal Length Change Potential

Rectangular aluminosilicate glass articles were produced using a downdraw method. The glasses were subsequently chemically toughened. After the chemical toughening, the relative thermal length change potential was determined as follows at a depth $x_c$ of 30% of the article thickness.

In order to determine the relative thermal length change potential, lengths of the glass article must be determined before and after thermal treatment and measured against one another. Glass articles with the nominal dimensions 140 mm×40 mm were used. Such glass articles have four lengths, two lengths with the nominal dimension 140 mm and two lengths with the nominal dimension 40 mm. The measurement can be performed in an analogous manner with samples of different dimensions.

The exact dimensions before and after thermal treatment were optically measured with a coordinate measuring machine of the type ZEISS O-Inspect. Since it is difficult for the optical measurement system of the facility to detect the edges, the edges were traced with a black Edding pen. The panel thus had a black edge with a width of approx. 4 mm around the circumference prior to the measurement.

Several sheets were measured at the same time. For this reason, an "alignment board" was produced. Up to 27 sheets can be properly aligned thereon by placing on stop pins. The geometric measurement of the up to 27 sheets can proceed automatically by a measurement program which knows the position of the individual sheets on the alignment board.

The measurement of an individual sheet was performed in three steps:

a) Determining the focus levels: In order to be able to set the correct focus level during optical measurement, the height position of the sample is measured first. For this purpose, the integrated white light interferometry sensor is moved along the edge of the sample and easily determines the z-position of the surface within the edge at several positions.

b) Determining the alignment of the sample: Before the exact measurement of the edge begins, the alignment of the sample is checked with a small degree of enlargement. For this purpose, the optical measurement system is moved over the (expected position) of one of the long edges. An image is recorded at a distance of approx. 1 mm. As a result of the blackening of the edge of the sample, there is a high contrast in this image at the edge. In order to determine the position of the edge, the machine generates a linear profile of the brightness values which runs perpendicular to the "expected" alignment of the edge. In this profile, the point at which the brightness value has dropped to 50% of the value in the bright range is regarded as the edge. A point of the edge is clearly defined by the position of the linear profile and the "50% pixel" thereon. The alignment of the edge in the coordinate system of the machine is thus calculated by virtue of the fact that a straight line is fitted through the thus measured points along the long edge. This straight line defines the alignment of the coordinate system of the sample.

c) Measuring the edges: Once the coordinate system of the sample is known, the machine moves the optical measurement system over the edges of the sample, wherein it follows the nominal dimensions. Points on the edge are now determined with high resolution at a distance of approx. 35 µm (short edges) or 100 µm (long edges)—corresponding to the description under b). Straight lines are fitted through the approx. 1500 measurement points per edge. The points of intersection of these straight lines define the corner of the sample. The four edge lengths can be determined with the aid of the four corners of the sample determined in this manner. The measurement accuracy of the machine is around <4 µm. In the case of an edge length of 140 mm, this corresponds approximately to 28 ppm. In the case of larger sample lengths, the measurement of the relative change in length becomes even more precise.

Both the initial geometry prior to thermal treatment and the final geometry after thermal treatment were performed in accordance with the described method.

The temperature treatment was performed in a furnace of the type Nabertherm N20/HR which is controlled via a controller of the type EUROTHERM 2604. The samples are placed at room temperature onto a flat Quarzal panel and these are then put into the furnace which is also at room temperature. A temperature profile is specified via the controller which the furnace then follows.

The temperature profile is composed of three elements:

1) Heating up: The furnace is heated up with a rate of 5K/min up to the nominal temperature. The nominal temperature was around 560° C. This corresponds in the case of the glass used to a temperature of 60 K below Tg. Since the parameters of the controller are set to the furnace, the slight overshoot in the case of the transition from heating up to the constant temperature can be ignored.

2) Holding time: The temperature in the furnace is kept constant in this period of time. The holding time was 24 hours.

3) Cooling: In order to allow the samples to cool as quickly as possible, the furnace is not heated further during cooling. It thus follows its characteristic time profile during cooling. The oven is opened at the earliest once the temperature in the interior of the furnace has fallen below 100° C. In the case of the furnace used, this was approximately 16 to 17 hours after the end of heating (see furnace curve in FIG. 3).

The described measurements of the initial and final geometry supply (via the measured corners of the samples) the four edge lengths prior to and after tempering. A separate relative thermal length change potential was determined according to the following formula for each edge from this.

$$\text{Relative thermal length change potential}_i = \frac{L_{i,after} - L_{i,before}}{L_{i,before}}$$

Variable i is a control variable which goes from 1 to 4 and with which the individual edges are indicated. $L_{i,before}$ is the length of the $i^{th}$ edge before thermal treatment and $L_{i,after}$ is the length of the $i^{th}$ edge after thermal treatment.

The average was calculated according to the following formula from these four individual values, relative thermal length change potential$_1$, relative thermal length change potential$_2$, relative thermal length change potential$_3$, and relatives thermal length change potential$_4$.

Relative thermal length change potential =

$$\frac{1}{4} \cdot \sum_{i=1}^{4} \text{Relative thermal length change potential}_i$$

This average is the relative thermal length change potential of the glass article.

The results are summarised in the following table.

|  | Ex. 1 | Ex. 2 | Ex. 3 | Ex. 4 | Ex. 5 |
|---|---|---|---|---|---|
| Relative thermal length change potential | −964 ppm | −810 ppm | −700 ppm | −200 ppm | +200 ppm |

All of the examples had a thickness of 50 µm. The difference between the examples lay merely in the drawing speed derived from the fictive temperatures.

The thickness can be set via the drawing rate with the same throughput. The throughput is proportional to the product of drawing rate and thickness. In the case of a constant throughput, for example, a doubling of the drawing rate is therefore associated with a halving of the glass thickness. In order to obtain glass articles with the same thickness in the case of different drawing rates, the throughput must be correspondingly adjusted. A constant thickness is achieved, for example, if the throughput is also doubled in the case of a doubling of the drawing rate. Likewise, in the case of a halving of the drawing rate, the throughput should be halved if the glass thickness is supposed to be kept constant.

A slower drawing rate can also be subsequently simulated by virtue of the fact that a sample is subjected to tempering after production, which leads to a reduction in the fictive temperature. In this case, reference is made to the equivalent drawing rate derived from the fictive temperatures.

The equivalent drawing rate derived from the fictive temperatures was highest in the case of Example 1, second highest in the case of Example 2, third highest in the case of Example 3, fourth highest in the case of Example 4 and lowest in the case of Example 5.

The drawing rate of Example 5 was so slow that a relative thermal length change potential with a positive sign was produced after chemical toughening on both sides to a depth of in each case 30% of the article thickness. Example 5 is therefore a comparative example which is not provided according to the invention.

2. Dependence of the Relative Thermal Length Change Potential on the Toughening Depth Rectangular aluminosilicate glass articles were produced using a downdraw method. The glasses were subsequently chemically toughened. After the chemical toughening, the relative thermal length change potential was determined at various depths $x_c$. Determination was performed as above in the first example part. The results are shown in FIGS. 1 and 2.

Five examples A to E of the same glass composition were tested. Examples A to C all had in each case a thickness of 50 µm and only differed in terms of the equivalent drawing speed derived from the fictive temperatures. The drawing rate was the highest in the case of Example C, the second highest in the case of Example B and lowest in the case of Example A. Examples D and E had larger thicknesses, namely 100 µm in the case of Example D and 300 µm in the case of Example E.

It was found that the rate of change of the relative thermal length change potential varies as a function of characteristic penetration depth $x_c$ with the thickness of the glass article. The thinner the glass article, the greater the rate of change of the relative thermal length change potential. The problem that the relative thermal length change potential is displaced by the chemical toughening into the positive value range therefore arise particularly in the case of thin glasses.

A comparison of Examples A to C furthermore shows that a positive relative thermal length change potential can be provided after chemical toughening in particular if a glass article in any event already has less negative values of the relative thermal length change potential, for example, as a result of a slow drawing rate.

The rate of change of the relative thermal length change potential as a function of characteristic penetration depth $x_c$ can be expressed in ppm/µm. FIG. 1 shows a linear relationship between the relative thermal length change potential and characteristic penetration depth $x_c$. The rate of change of the relative thermal length change potential as a function of characteristic penetration depth $x_c$ can thus easily determined as a gradient of the data represented in FIG. 1. FIG. 2 shows the same data after standardisation of characteristic penetration depth $x_c$ to the respective article thickness (relative penetration depth). The relative penetration depth is calculated by division of characteristic penetration depth $x_c$ by the article thickness and is indicated in FIG. 2 as a percentage value. A characteristic penetration depth $x_c$ of 40 µm produces in the case of an article thickness of 100 µm, for example, a relative penetration depth of 40%.

3. Reduction in the Fictive Temperature by Tempering

An aluminosilicate glass article with a fictive temperature of approximately 750° C. underwent the tempering described under "1. Relative thermal length change potential". As a result of this, the fictive temperature was reduced from approximately 750° C. to less than 600° C. (FIG. 3).

FIG. 1 shows the relative thermal length change potential (y-axis) of various glass articles as a function of the characteristic penetration depth $x_c$ (x-axis). Five examples A to E of the same glass composition are shown. Examples A to C had in each case a depth of 50 µm and differed only in terms of their corresponding drawing speeds. The corresponding drawing rate was the highest in the case of Example C, the second highest in the case of Example B and the lowest in the case of Example A. Examples D and E has greater thicknesses, namely 100 µm in the case of Example D and 300 µm in the case of Example E.

FIG. 2 shows the relative thermal length change potential (y-axis) of glass articles A to E as a function of the relative penetration depth (x-axis). The relative penetration depth is calculated as a quotient from characteristic penetration depth $x_c$ and article thickness and indicated as "% of the article thickness".

FIG. 3 shows the temperature profile of the furnace (continuous line) and the profile of the fictive temperature (dashed line) of a glass article tempered with the corresponding temperature profile. The y-axis shows the temperature in ° C., wherein both the furnace temperature and the fictive temperature of the glass article can be read. The x-axis shows the time in hours (h).

FIG. 4 shows, by way of example, the profile, brought about by an exchange process, of the concentration of an ion $Ion_I$, the proportion of which is increased in the exchange layer in comparison with the bulk glass layer (for example, $K^+$). The ion concentration is indicated on the y-axis and the relative glass depth position is indicated on the x-axis. A relative glass depth position of 0 corresponds to the surface of the glass. The concentration of the ion is highest there (represented here as 100%). The x-position indicates the distance from the glass surface. It is apparent that the concentration of the ion drops from the surface towards the interior of the glass, following a complementary error function (erfc). The glass depth position is indicated relative to $x_c$. In the case of a depth of $x=x_c$, the proportion of the ions which goes beyond the base proportion with increased proportions in the exchange layer in comparison with the bulk layer is approximately 15.7% of the maximum excess proportion located on the surface of the glass.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A toughenable glass article comprising a glass and having a thickness of less than 100 µm and a cooling state which is such that, after chemical toughening to a characteristic penetration depth ($x_c$) of 30% of the thickness, the glass article has a relative thermal length change potential in a range from −1500 ppm to ≤0 ppm.

2. The toughenable glass article of claim 1, wherein the thickness is in a range from 15 µm to 70 µm.

3. The toughenable glass article of claim 1, wherein the glass article has at least one fire-polished surface.

4. The toughenable glass article of claim 1, wherein the glass article has a surface roughness RMS of at most 5 nm.

5. The toughenable glass article of claim 1, wherein the glass article is not toughened.

6. The toughenable glass article of claim 1, wherein the glass article has a threshold diffusivity of at least 10 μm² per hour.

7. The toughenable glass article of claim 1, wherein the glass of the glass article is selected from the group consisting of aluminosilicate glass, boroaluminosilicate glass, silicate glass and borosilicate glass and wherein the glass comprises $Na_2O$ in a proportion of at least 9 wt. %.

8. The toughenable glass article of claim 1, wherein a rate of change of the relative thermal length change potential as a function of characteristic penetration depth ($x_c$) lies in a range from 30 ppm per μm $x_c$ to 1000 ppm per μm $x_c$.

9. The toughenable glass article of claim 1, wherein a surface compressive stress (CS) after chemical toughening to the characteristic penetration depth ($x_c$) of 30% of the article thickness lies in a range from 600 MPa to 1000 MPa.

10. The toughenable glass article of claim 1, wherein a rate of change of the relative thermal length change potential as a function of a relative penetration depth is in a range from 20 ppm per % of the thickness of the glass article to 100 ppm per % of the thickness of the glass article.

11. The toughenable glass article of claim 1, wherein the glass has the following components:

| | (Wt.-%) |
|---|---|
| $SiO_2$ | 40-75 |
| $Al_2O_3$ | 10-30 |
| $B_2O_3$ | 0-20 |
| $Na_2O + K_2O$ | >0-30 |
| $MgO + CaO + SrO + BaO + ZnO$ | 0-25 |
| $TiO_2 + ZrO_2$ | 0-15 |
| $P_2O_5$ | 0-10. |

12. The toughenable glass article of claim 1, wherein the toughenable glass article has a rate of change of the relative thermal length change potential as a function of characteristic penetration depth ($x_c$) in a range from 30 ppm per μm $x_c$ to 1000 ppm per μm $x_c$ and a threshold diffusivity (D) of at least 10 μm² per hour, wherein the glass is selected from the group consisting of aluminosilicate glass, boroaluminosilicate glass, silicate glass and borosilicate glass and wherein the glass comprises $Na_2O$ in a proportion of at least 9 wt. %.

13. The toughenable glass article of claim 1, wherein a roughness depth ($R_1$) of the glass article is at most 6 nm.

14. A toughenable glass article, comprising a glass and having a rate of change of a relative thermal length change potential as a function of characteristic penetration depth ($x_c$) in a range from 30 ppm per μm $x_c$ to 1000 ppm per μm $x_c$.

15. The toughenable glass article of claim 14, wherein the glass article has a thickness in a range from 15 μm to 70 μm.

16. The toughenable glass article of claim 14, wherein the glass article has at least one fire-polished surface.

17. The toughenable glass article of claim 14, wherein the glass article has a surface roughness RMS of at most 5 nm.

18. The toughenable glass article of claim 14, wherein the glass article is not toughened.

19. The toughenable glass article of claim 14, wherein the glass article has a threshold diffusivity of at least 10 μm² per hour.

20. The toughenable glass article of claim 14, wherein the glass is selected from the group consisting of aluminosilicate glass, boroaluminosilicate glass, silicate glass and borosilicate glass and wherein the glass comprises $Na_2O$ in a proportion of at least 9 wt. %.

* * * * *